United States Patent [19]

Hicken et al.

[11] 4,441,242
[45] Apr. 10, 1984

[54] SPENT FUEL CONSOLIDATION SYSTEM

[75] Inventors: Michael G. Hicken, Murrysville; Fred Kirschensteiner, Forest Hills; Duane A. True, Pittsburgh; Alexander Taleff, Churchill Boro, all of Pa.

[73] Assignee: Westinghouse Electric Corp., Pittsburgh, Pa.

[21] Appl. No.: 268,311

[22] Filed: May 29, 1981

[51] Int. Cl.³ .............................................. B23P 19/00
[52] U.S. Cl. .................................. 29/419 R; 29/426.2; 29/426.3; 29/723; 376/272; 376/261
[58] Field of Search .................. 376/272, 261; 29/723, 29/419, 400 N, 426.2, 426.3

[56] References Cited

U.S. PATENT DOCUMENTS

| | | | |
|---|---|---|---|
| 2,995,504 | 8/1961 | Taylor | 376/272 X |
| 3,533,911 | 10/1970 | Fortescue . | |
| 3,620,880 | 11/1971 | Lemelson | 29/419 X |
| 3,667,540 | 6/1972 | Kapp . | |
| 3,748,713 | 7/1973 | Tindale et al. | 29/723 X |
| 3,791,466 | 2/1974 | Patterson et al. . | |
| 3,795,042 | 3/1974 | Kreider et al. | 29/419 X |
| 3,807,018 | 4/1974 | Ehrman et al. | 29/400 N X |
| 3,827,579 | 8/1974 | Kendall | 29/723 X |
| 3,859,533 | 1/1975 | Suvanto . | |
| 3,889,348 | 6/1975 | Lemelson | 29/419 X |
| 4,006,362 | 2/1977 | Mollon et al. . | |
| 4,024,406 | 5/1977 | Bevilacqua . | |
| 4,039,842 | 8/1977 | Mollon . | |
| 4,042,828 | 8/1977 | Rubinstein et al. . | |
| 4,096,392 | 6/1978 | Rubinstein et al. . | |
| 4,139,778 | 2/1979 | Raymond | 376/272 |

FOREIGN PATENT DOCUMENTS 5623  11/1979  European Pat. Off. ............ 376/272

OTHER PUBLICATIONS

"The Problem of Nuclear Waste–We've Got to Solve it Soon," *Changing Times*, Feb. 1979.
"NAC to Test DOE Calculation that Repacking Can Add Fuel Storage at $10/kg., *Nuclear Fuel*, Jan. 19, 1981, p. 16.

*Primary Examiner*—Harvey E. Behrend
*Assistant Examiner*—Daniel Wasil
*Attorney, Agent, or Firm*—L. A. DePaul

[57] ABSTRACT

The spent fuel consolidation system provides method and apparatus for remotely vertically and horizontally compacting an array of spent fuel rods while the fuel rods remain submerged in a coolant. The invention comprises a row ordering section for rearranging the configuration of the fuel rods, horizontal consolidation section for horizontally compacting several rows of fuel rods, and a vertical consolidation section for vertically compacting several rows of horizontally compacted fuel rods. The system is capable of compacting the fuel rods from a given fuel assembly to about one half of the volume originally occupied by such fuel rods in the fuel assembly thereby providing greater storage capacity for a given volume of spent fuel storage.

16 Claims, 14 Drawing Figures

000
SPENT FUEL CONSOLIDATION SYSTEM

CROSS-REFERENCE TO RELATED APPLICATIONS

This application is related to copending United States patent application Ser. No. 268,225 filed herewith in the name of P. Pomaibo, et al. and entitled "Spent Fuel Consolidation System" which is assigned to the Westinghouse Electric Corporation.

BACKGROUND OF THE INVENTION

This invention relates to storage of nuclear fuel assemblies and more particularly to the consolidation and storage of spent nuclear fuel rods.

After a period of operation of a nuclear reactor, the fuel assemblies comprising the core of the nuclear reactor must be rearranged with the depleted or spent fuel assemblies being replaced with fresh ones. The spent fuel assemblies are removed from the reactor vessel and generally stored in a pool of water on the reactor site. Since a conventional fuel assembly comprises structure other than fuel rods such as grids and control rod guide tubes, a spent fuel assembly occupies more space in the storage pool than would be required for the individual fuel rods. Because the storage pool has a finite volume it would be desirable to be able to store the fuel rods in a closely packed array and with a minimum of support structure to thereby maximize the amount of spent nuclear fuel that can be stored in a given volume of the storage pool. This would provide a greater storage capacity for the spent fuel rods until the fuel rods are transported off the reactor site for storage or reprocessing.

However, since the spent fuel rods have been irradiated during reactor operation, they are highly radioactive and can be handled only by remote manipulators and while the fuel rods are submerged in a coolant. The radioactive nature of the spent fuel assemblies increases the difficulty of not only transporting the spent fuel assembly but of also dismantling the fuel assembly and storing the spent fuel rods.

Therefore, what is needed is a system for removing the spent fuel rods from a spent fuel assembly and for storing the spent fuel rods in as small a volume as is possible.

SUMMARY OF THE INVENTION

The spent fuel consolidation system provides method and apparatus for remotely vertically and horizontally compacting an array of spent fuel rods while the fuel rods remain submerged in a coolant. The invention comprises a row ordering section for rearranging the configuration of the fuel rods, horizontal consolidation section for horizontally compacting several rows of fuel rods, and a vertical consolidation section for vertically compacting several rows of horizontally compacted fuel rods. The system is capable of compacting the fuel rods from a given fuel assembly to about one half of the volume originally occupied by such fuel rods in the fuel assembly thereby providing greater storage capacity for a given volume of spent fuel storage.

BRIEF DESCRIPTION OF THE DRAWINGS

While the specification concludes with claims particularly pointing out and distinctly claiming the subject matter of the invention, it is believed the invention will be better understood from the following description taken in conjunction with the accompanying drawings, wherein:

DESCRIPTION OF THE PREFERRED EMBODIMENT

When it is desired to consolidate spent fuel rods of a nuclear fuel assembly, it is first necessary to disassemble the fuel assembly and then rearrange the fuel rods into a compact configuration. The invention described herein provides a system for removing the fuel rods from the fuel assembly and for remotely rearranging the fuel rods in a consolidated fashion.

Figure 1:
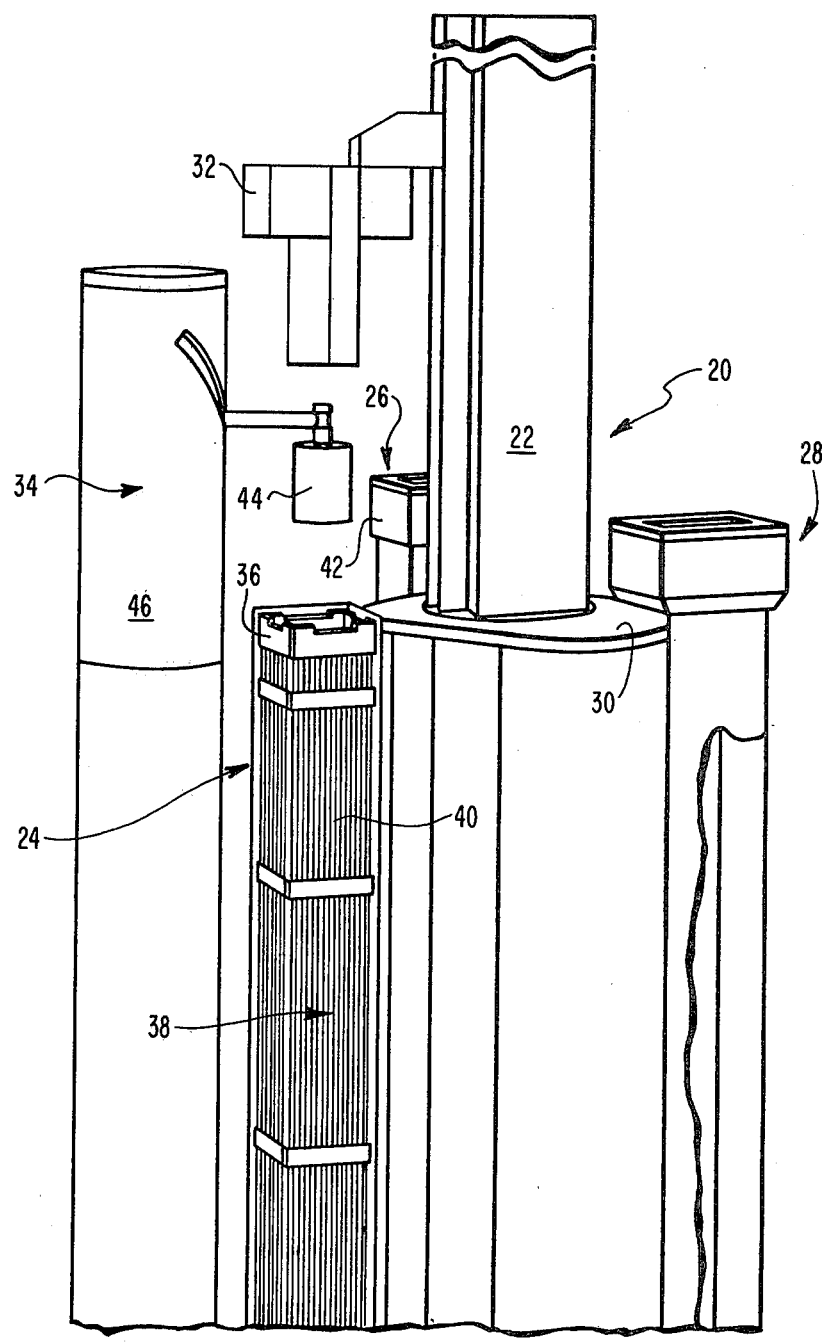
FIG. 1 is a view in perspective of the spent fuel consolidation system.

Referring to FIG. 1, the spent fuel consolidation system comprises a rotatable platform 20 that is capable of rotating about its vertical axis under the influence of a drive system (not shown) and that is capable of operating while completely submerged in a fluid such as water. Platform 20 comprises a vertical support 22, a fuel assembly station 24, consolidation station 26 and canister station 28. Fuel assembly station 24, consolidation station 26, and canister station 28 are attached to support plate 30 which is rotatably attached to vertical support 22. Support plate 30 is arranged such that when it is rotated about vertical support 22, fuel assembly station 24, consolidation station 26 and canister station 28 may be selectively positioned with respect to gripper mechanism 32 which is slidably mounted on vertical support 22. A nozzle removal mechanism 34 is also arranged near platform 20 for removing top nozzle 36 from fuel assembly 38. Fuel assembly 38 may be one such as that described in U.S. Pat. No. 3,791,466 issued Feb. 12, 1974 in the name of J. F. Patterson et al.

In general, fuel assembly station 24 provides a station for holding spent fuel assembly 38 while top nozzle 36 and spent fuel rods 40 are removed therefrom. Fuel rods 40 are generally cylindrical metallic tubes containing nuclear fuel as is well understood in the art. Consolidation station 26 provides a station for rearranging fuel rods 40 into a closely packed configuration without the need for the remainder of the fuel assembly support structure. Canister station 28 provides a station for locating a canister 42 for accepting and holding fuel rods 40 after fuel rods 40 have been consolidated by consolidation station 26.

Figure 2:
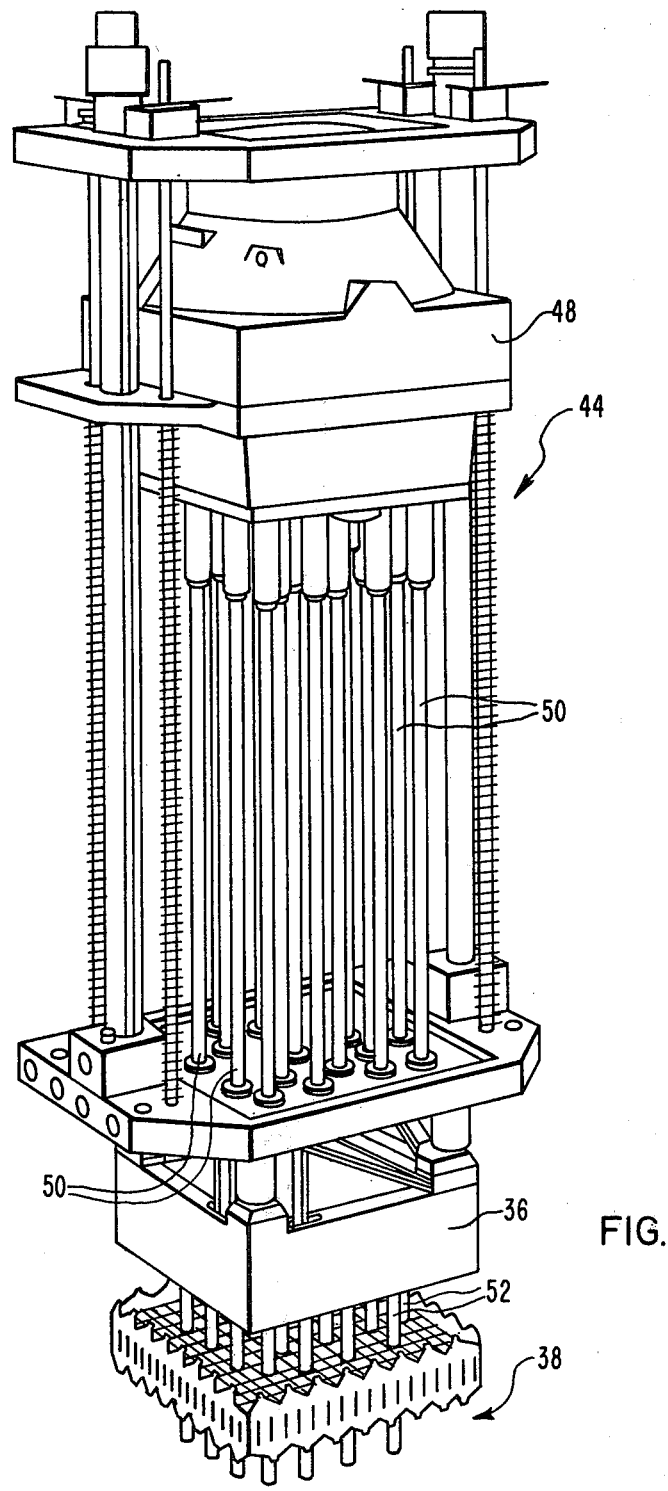
FIG. 2 is a view in perspective of the internal cutter mechanism.

Referring now to FIGS. 1 and 2, nozzle removal mechanism 34 comprises an internal cutter mechanism 44 that is slidably mounted on positioning mechanism 46. Internal cutter mechanism 44 may comprise a drive mchanism 48 with a plurality of internal cutters 50 connected thereto. Positioning mechanism 46 serves to position internal cutter mechanism 44 over fuel assembly 38 of fuel assembly station 24. Since the typical fuel assembly 38 comprises a top nozzle 36 which is attached to a plurality of control rod guide tubes 52, it is necessary to cut control rod guide tubes 52 so that the upper portion of control rod guide tubes 52 and top nozzle 36 may be removed to expose the top ends of the spent fuel rods 40. When internal cutter mechanism 44 is lowered onto top nozzle 36 by positioning mechanism 46, an internal cutter 50 is slid into each control rod guide tube 52. Once in this position, drive mechanism 48 is activated which causes each internal cutter 50 to rotate in each control rod guide tube 52 and to sever the top section of each control rod guide tube 52 from the remainder of the control rod guide tube. Positioning mechanism 46 then removes internal cutter mechanism 44 from top nozzle 36.

Figure 3:
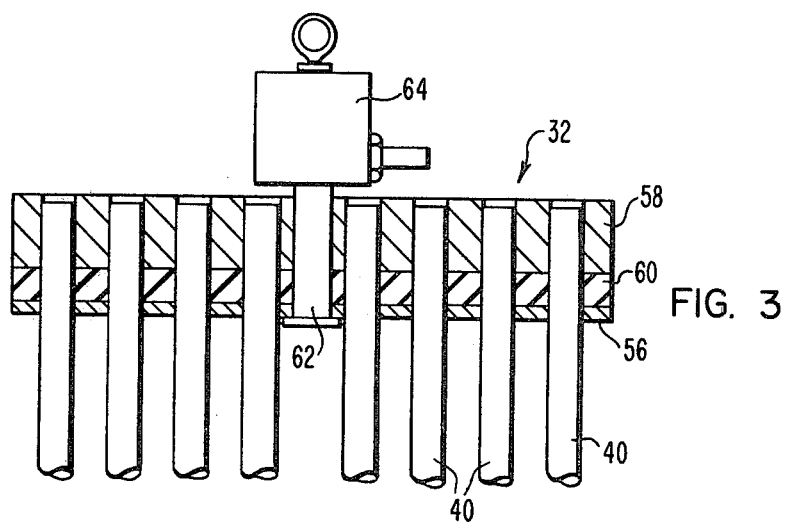
FIG. 3 is a cross-sectional view of the gripper mechanism.

Referring now to FIG. 3, gripper mechanism 32 may comprise a metal first plate 56, a metal second plate 58 and a flexible member 60 disposed therebetween. First plate 56 may be connected to a rod 62 that is disposed through second plate 58 and flexible member 60 and is connected to an hydraulic cylinder 64. First plate 56, second plate 58, and flexible member 60 have holes therein for accommodating the insertion of fuel rods 40 such that when hydraulic cylinder 64 is activated first plate 56 and second plate 58 are drawn together thereby squeezing flexible member 60, which may be a rubber plate, into contact with fuel rods 40. In this manner, fuel rods 40 may be firmly gripped for removal from fuel assembly 38.

Figure 4:
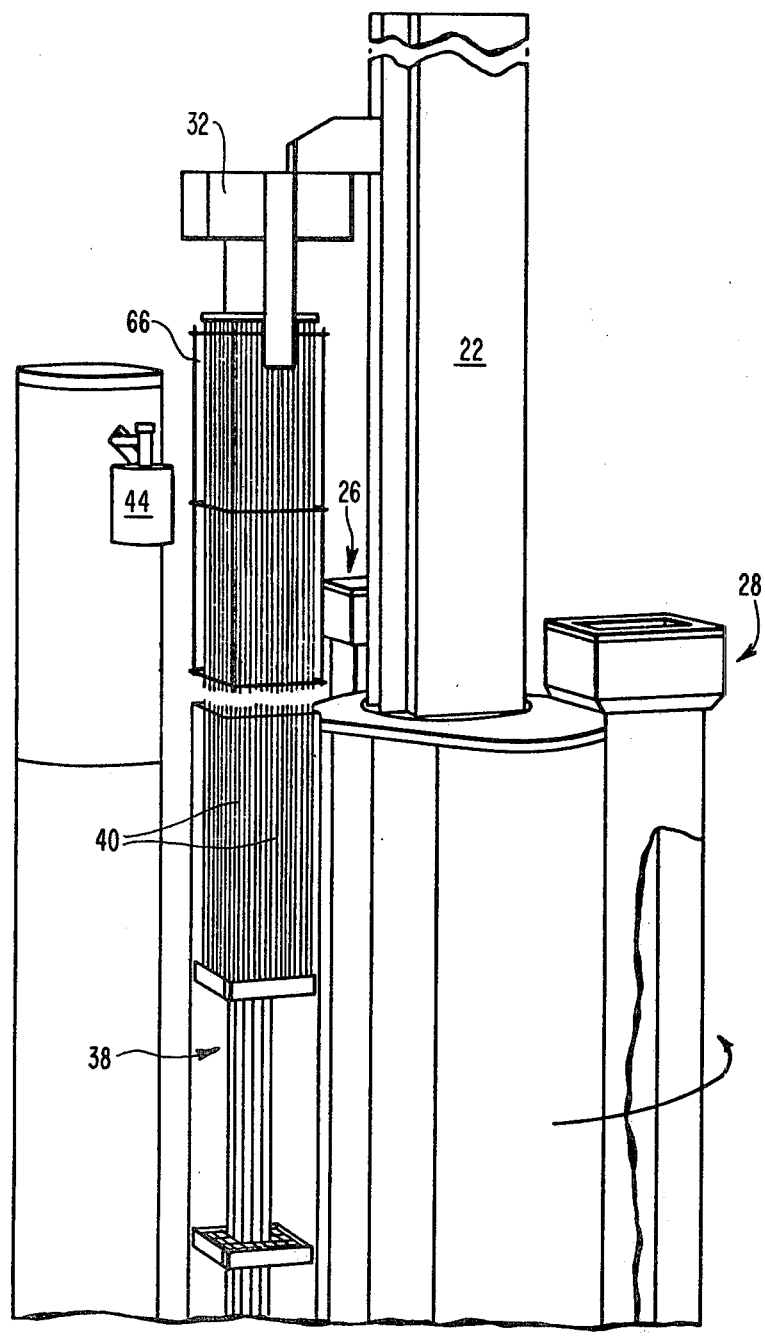
FIGS. 4–6 are views in perspective of the spent fuel consolidation system.

Referring to FIG. 4, when top nozzle 36 has been removed from fuel assembly 38, internal cutter mechanism 44 is moved away from fuel assembly station 24 and gripper mechanism 32 is moved downwardly along vertical member 22 and into contact with the exposed fuel rods 40 of fuel assembly 38. Gripper mechanism 32 then grips each fuel rod 40 as previously described. With gripper mechanism 32 gripping each fuel rod 40, gripper mechanism 32 is moved upwardly along vertical support 22. Since fuel assembly 38 is locked at its lower end to fuel assembly station 24, the upward pulling of fuel rods 40 by gripper mechanism 32 removes fuel rods 40 from the remainder of fuel assembly 38. In addition, a cage 66 which may have comb-like fingers may be attached to gripper mechanism 32 for maintaining the alignment of fuel rods 40 relative to each other. In this manner, fuel rods 40 can be removed from the remainder of fuel assembly 38.

Figure 5:
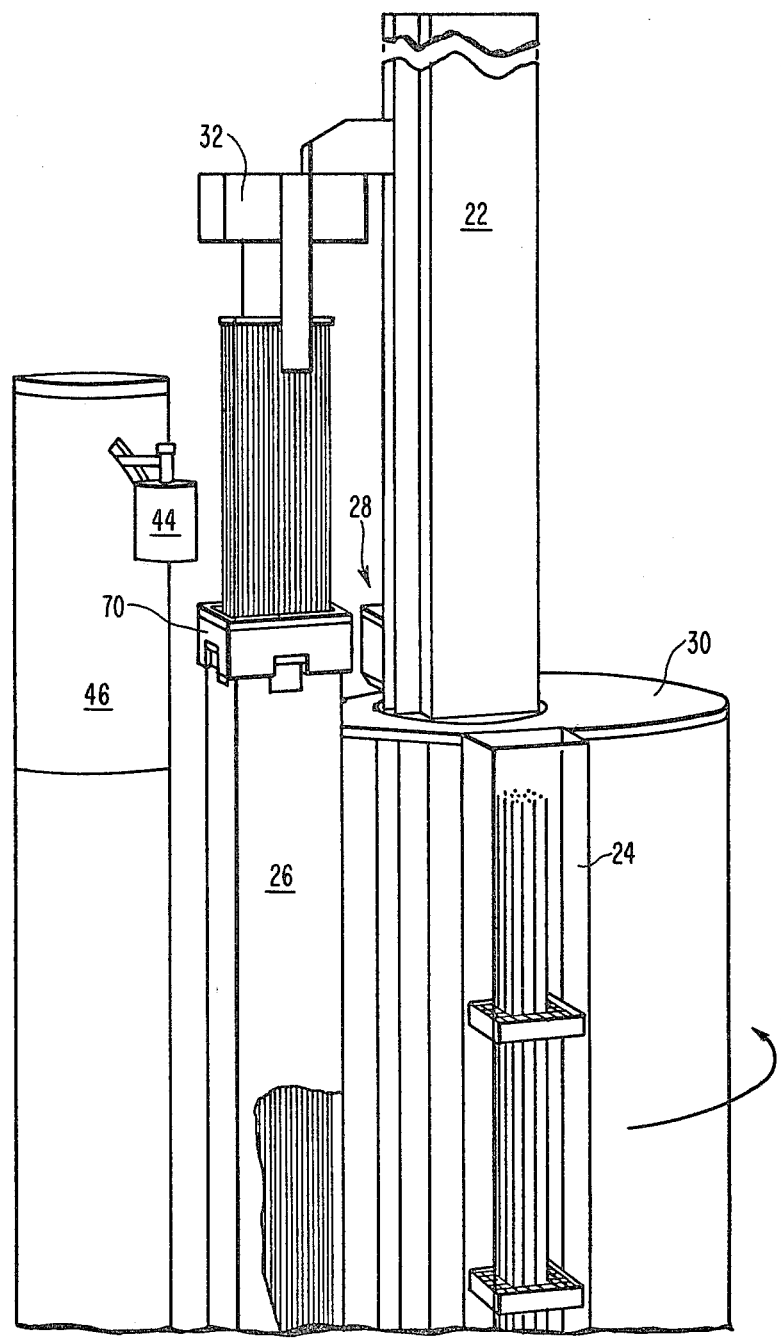
Figure 6:
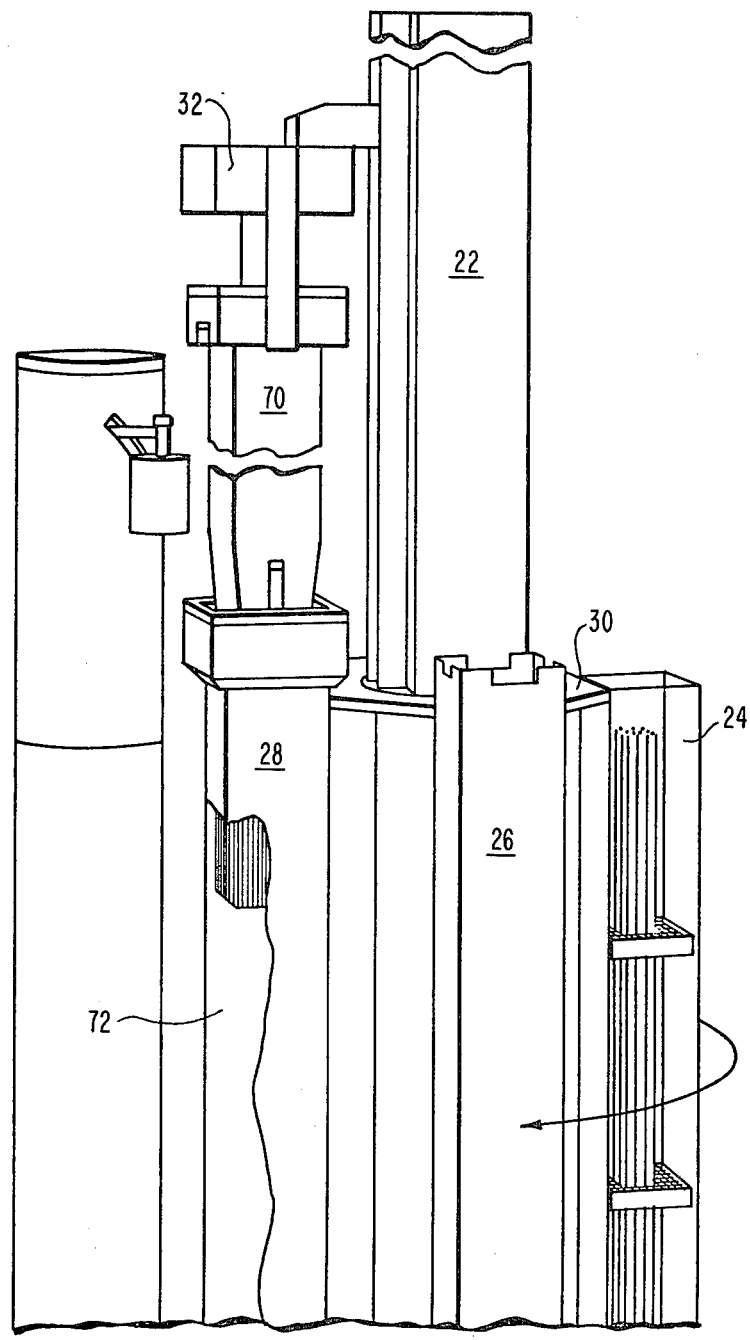

Referring now to FIGS. 4, 5 and 6 with gripper mechanism 32 is its uppermost position, platform 20 may be rotated which will cause consolidation station 26 to be positioned under gripper mechanism 32 and fuel rods 40. Next, gripper mechanism 32 is lowered along vertical support 22 so that fuel rods 40 are inserted into consolidation mechanism 70 of consolidation station 26. Consolidation mechanism 70 vertically and horizontal packs fuel rods 40 as fuel rods 40 are lowered into consolidation mechanism 70 thereby closely packing fuel rods 40. When gripper mechanism 32 has reached its lowermost position, gripper mechanism 32 releases fuel rods 40 so that fuel rods 40 are completely contained in consolidation mechanism 70. Next, gripper mechanism 32 by means of a conventional gripper (not shown), is caused to grip consolidation mechanism 70. While holding consolidation mechanism 70, gripper mechanism 32 is again raised along vertical support 22 until consolidation mechanism 70 with the fuel rods 40 therein is raised clear of consolidation station 26. With consolidation mechanism 70 lifted clear of consolidation station 26, platform 20 is again rotated until canister station 28 is located under consolidation mechanism 70. When consolidation mechanism 70 is over canister station 28, gripper mechanism 32 is lowered thereby positioning consolidation mechanism 70 on a canister 72 of canister station 28. With consolidation mechanism 70 positioned on canister 72, the bottom end of consolidation mechanism 70 is remotely opened thereby depositing fuel rods 40 into canister 72 in a closely packed fashion. Each canister 72 may be arranged with a divider so that each canister 72 can hold more than one set of consolidated fuel rods 40. Once fuel rods 40 have been deposited in canister 72, consolidation mechanism 70 may be returned to consolidation station 26 by lifting consolidation mechanism 70 and rotating platform 20 in a reverse direction.

When consolidation mechanism 70 has been returned to consolidation station 26 and when the remainder of fuel assembly 38 has been removed from fuel assembly station 24, the spent fuel consolidation system is ready to accept an additional spent fuel assembly in fuel assembly station 24. Thus, the system may be used to consolidate several sets of fuel rods 40 into a smaller configuration and store them in a single canister, while the fuel rods are maintained underwater. When a particular canister 72 is filled in this manner, the canister may be remotely moved to a spent fuel storage pool for further storage.

Figure 7:
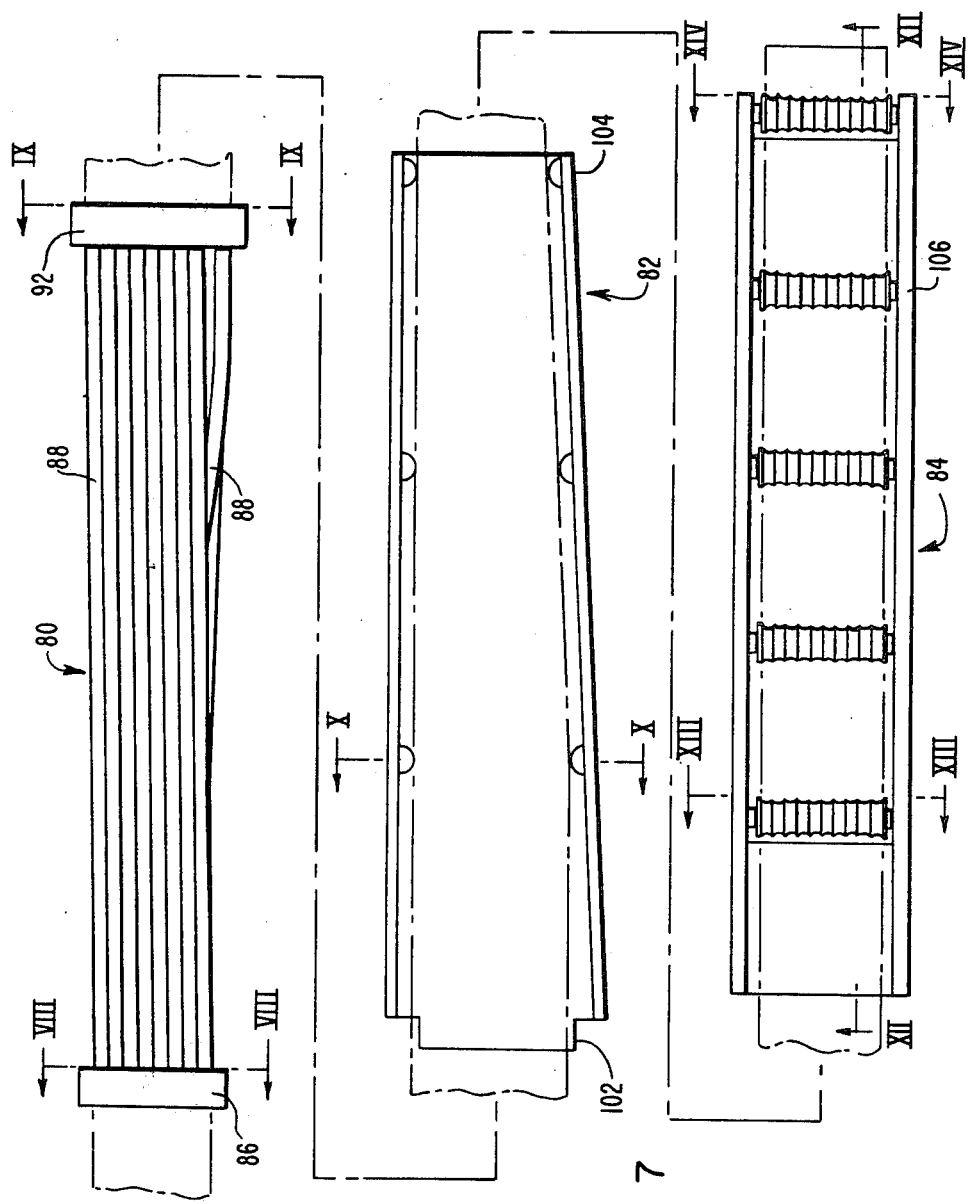
FIG. 7 is a partial view in elevation of the consolidation mechanism.
Figure 8:
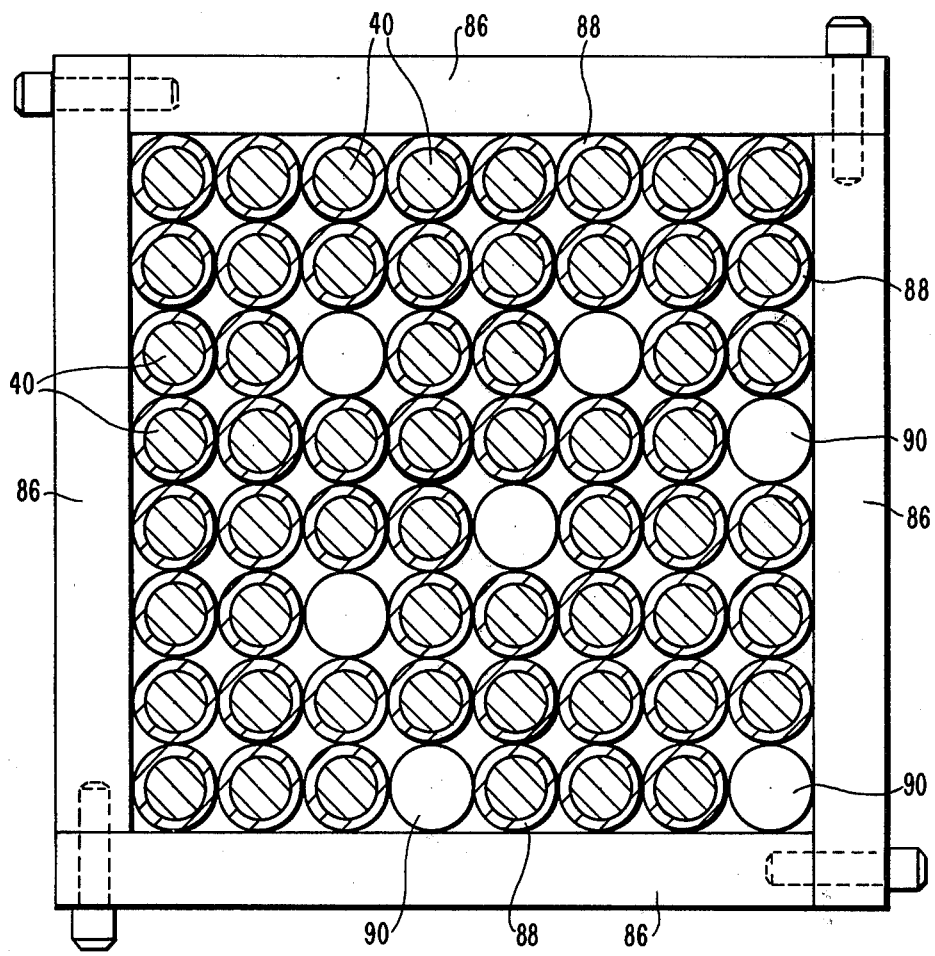
FIG. 8 is a view along line VIII—VIII of FIG. 7.
Figure 9:
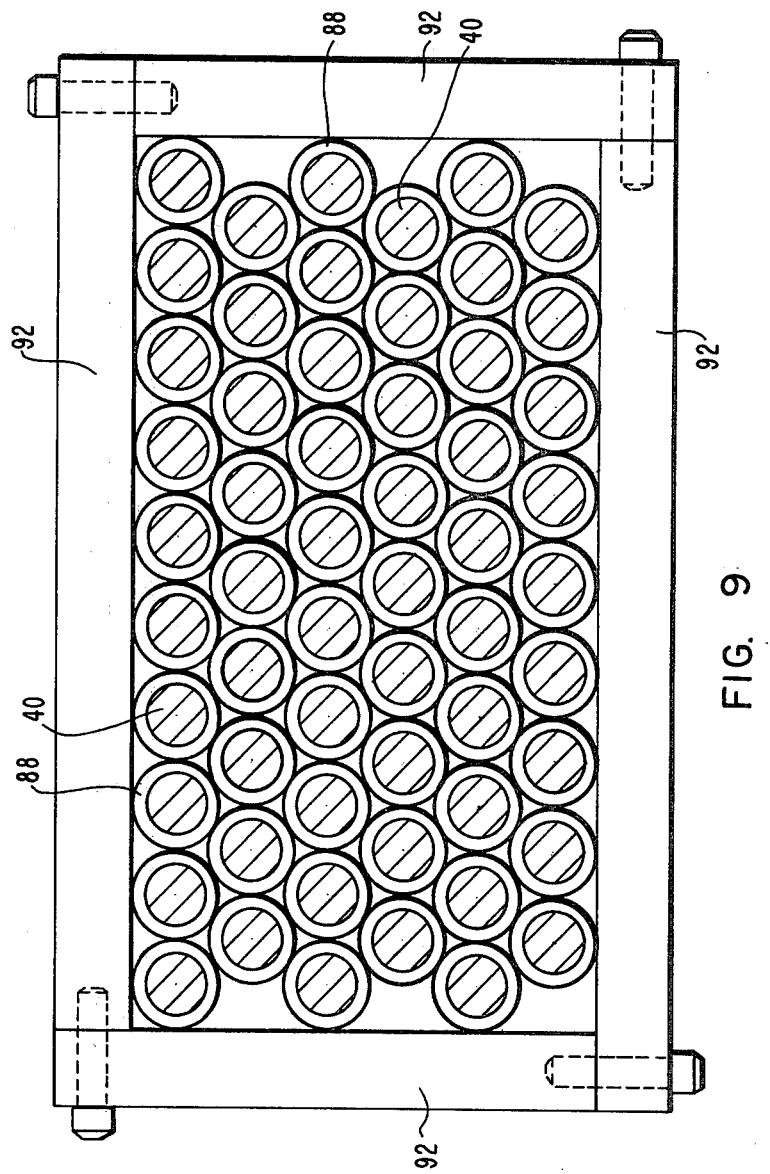
FIG. 9 is a view along line IX—IX of FIG. 7.

Referring now to FIGS. 7-9, consolidation mechanism 70 comprises a row ordering section 80, a horizontal consolidation section 82, and a vertical consolidation section 84. Row ordering section 80 comprises a first frame 86 manufactured from a material such as aluminum for supporting an array of hollow guide tubes 88. Guide tubes 88 may be stainless steel tubes having a length of approximately 7 feet and having an inside diameter of approximately 0.50 inches for accommodating the insertion of fuel rods 40. Guide tubes 88 are arranged in first frame 86 to conform to the same arrangement as fuel rods 40 have in a fuel assembly such that when fuel rods 40 are introduced into consolidation mechanism 70 by gripper mechanism 32 each fuel rod 40 slides into a separate guide tube 88. In addition to guide tubes 88, a plurality of plugs 90 are disposed between guide tubes 88 in a position to correspond to the positions of a fuel assembly that have no fuel rods such as control rod locations. Plugs 90 serve to maintain alignment of guide tubes 88 and to maintain a configuration corresponding to that of fuel rods 40 in a fuel assembly.

Row ordering section 80 also comprises an aluminum second frame 92 for supporting the other end of guide tubes 88. However, guide tubes 88 are not arranged in second frame 92 in the same configuration as in first frame 86. Rather, some of guide tubes 88 may be slightly curved or bent so as to form a closely packed array of guide tubes 88 as shown in FIG. 9. As can be seen from a comparison of FIGS. 8 and 9, guide tubes 88 extend from first frame 86 to second frame 92 but the ends of some of the guide tubes 88 are arranged in a different configuration in each of such frames. This arrangement of guide tubes 88 provides a means by which a set of fuel rods 40 having the same configuration as the fuel rods in a fuel assembly can be introduced in one end of guide tubes 88 and moved through guide tubes 88 to exit guide tubes 88 in a more closely packed array. It should be noted that not only does the configuration in second frame 92 eliminate plugs 90 but it may also transform the configuration of first frame 86 from a substantially square array to a substantially rectangular array. Of course, the particular array chosen for second frame 92 is primarily dependent on the configuration chosen for the final storage of fuel rods 40. Since the length of each fuel rod 40 exceeds the length of each guide tube 88, several of the fuel rods 40 may be slightly bent during its travel through guide tubes 88. However, such slight bending is well within the flexibility capabilities of a typical fuel rod 40. Moreover, fuel rods 40 can be moved through guide tubes 88 under mere gravitational force due to the weight of each fuel rod 40 or they may be pushed through guide tubes 88 without damage to the fuel rods 40.

Figure 11:
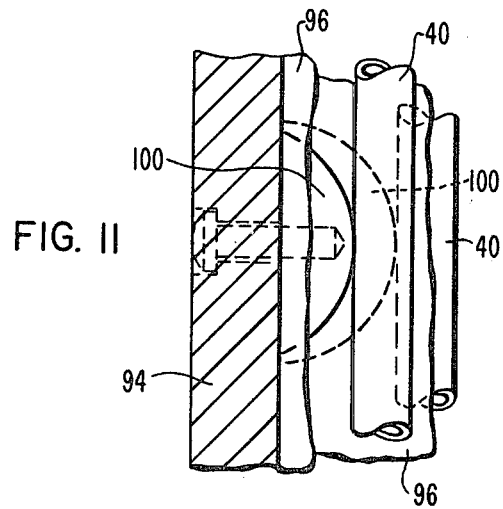
FIG. 11 is a view along line XI—XI of FIG. 10.
Figure 10:
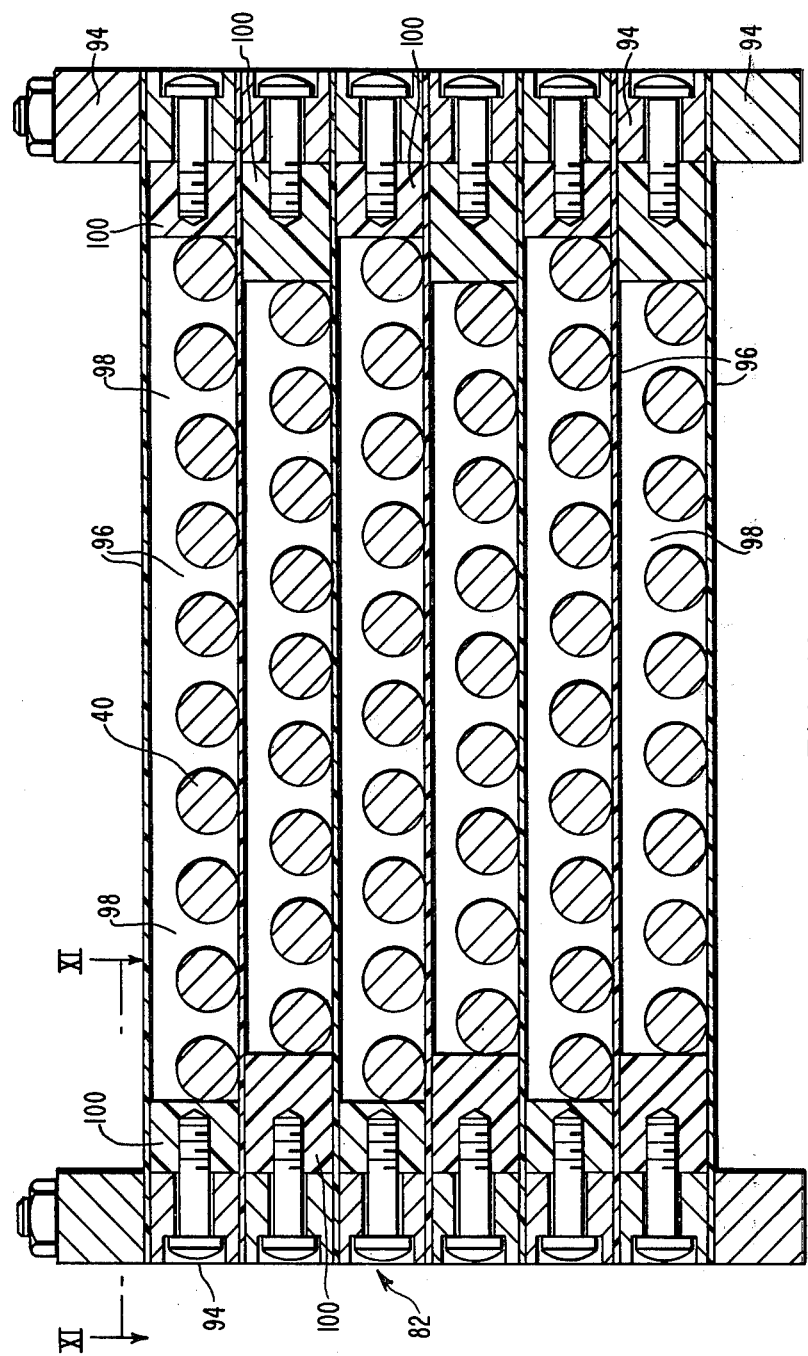
FIG. 10 is a view along line X—X of FIG. 7.
Figure 13:
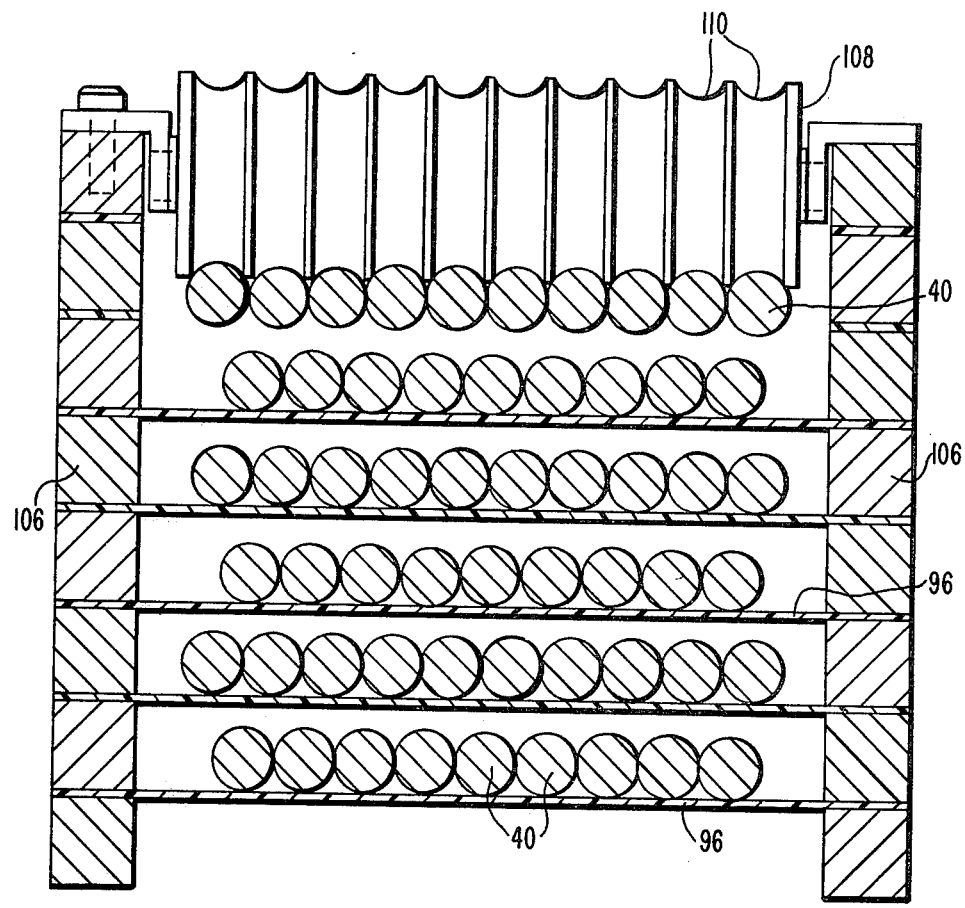
FIG. 13 is a view along line XIII—XIII of FIG. 7.

Referring now to FIGS. 7, 10 and 11, horizontal consolidation section 82 comprises a first housing 94 having a plurality of horizontal stainless steel plates 96 attached thereto defining a plurality of horizontal spaces 98 for accommodating fuel rods 40 as fuel rods 40 exit row ordering section 80. A plurality of spacers 100 are attached to first housing 94 and are disposed between plates 96 in spaces 98 for contacting the outermost fuel rod 40 in each space 98. The spacers 100 in alternate spaces 98 may be of different lengths for contacting the outermost fuel rod 40 based on the configuration of fuel rods 40 in each space 98. The ends of guide tubes 88 of row ordering section 80 are disposed in spaces 98 and between plates 96 at first end 102 of horizontal consolidation section 82 for introducing fuel rods 40 into the corresponding space 98. First housing 94 is arranged to have a longer width at first end 102 than at second end 104 so that as fuel rods 40 are moved therethrough, the outermost fuel rod 40 is moved inwardly by contacting spacers 100 thereby horizontally closely packing each horizontal row of fuel rods 40 while maintaining the vertical spacing between each horizontal row of fuel rods 40 by means of plates 96. In this manner, horizontal consolidation section 82 provides a means to horizontally compact fuel rods 40 as they exit row ordering section 80.

Figure 12:
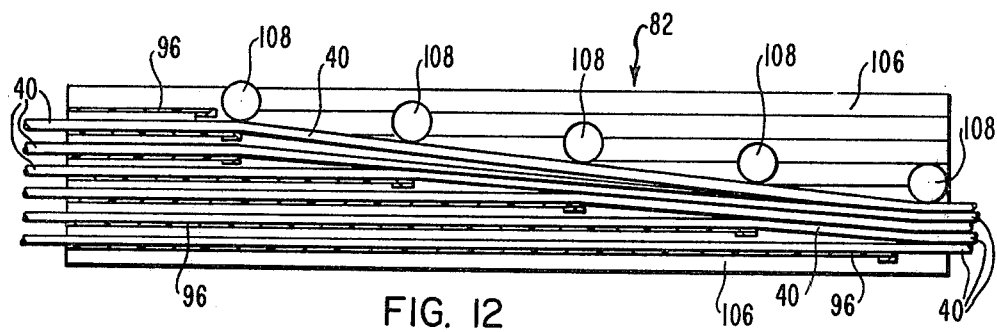
FIG. 12 is a view along line XII—XII of FIG. 7.

Referring to FIGS. 7 and 12-14, vertical consolidation section 84 comprises a second housing 106 attached to first housing 94 and arranged to support plates 96 which extend from first housing 94 into second housing 106. As shown in FIG. 12, plates 96 are of different lengths so that the uppermost plates 96 are shorter than the lowermost plates 96 and with the intermediate plates 96 having a length longer than the uppermost plates 96 and shorter than the lowermost plates 96. In this arrangement, each succeeding plate 96 is generally longer than the preceding one from top to bottom. In addition, a plurality of rollers 108 are mounted on second housing 106 and arranged to contact fuel rods 40 as fuel rods 40 exit plates 96. Rollers 108 are attached to second housing 106 at different elevations corresponding to the ends of plates 96 such that as a row of fuel rods 40 passes beyond the end of a plate 96, the fuel rods 40 contact a roller 108 for maintaining the horizontal alignment of the fuel rods 40 and for slightly bending the fuel rods downwardly and into contact with the next row of fuel rods 40. Rollers 108 may be formed with grooves 110 for accommodating the shape of fuel rods 40 and for maintaining the horizontal alignment of fuel rods 40.

Figure 14:
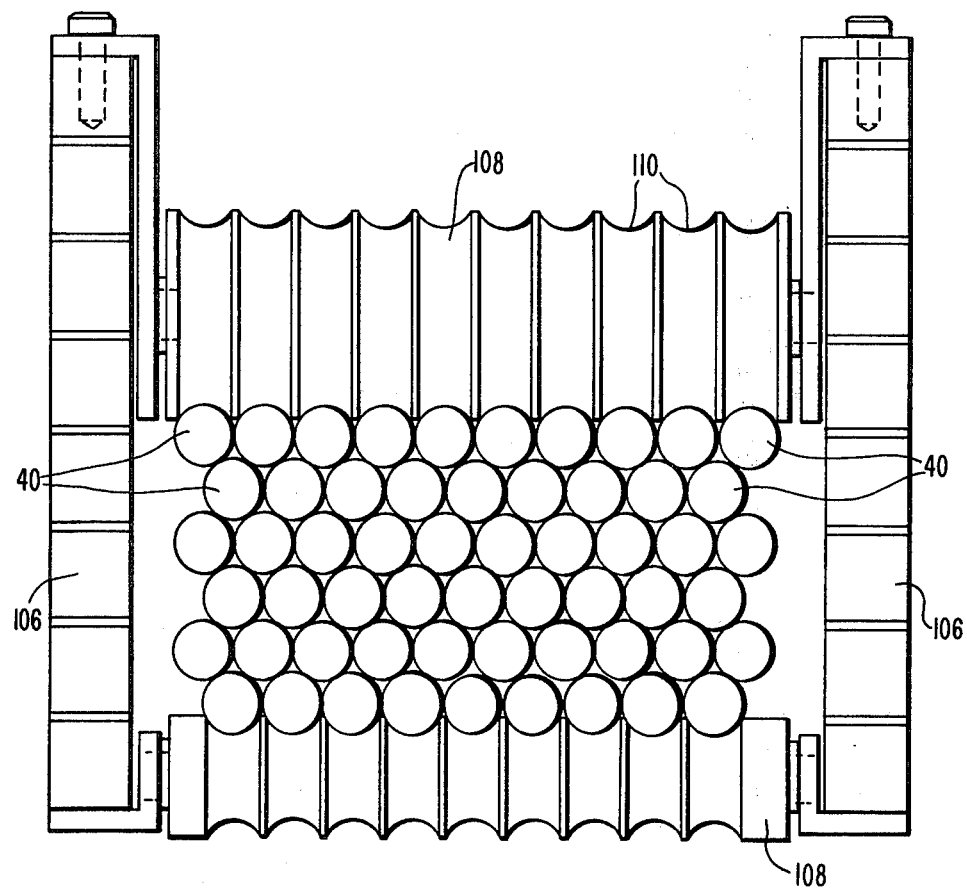
FIG. 14 is a view along line XIV—XIV of FIG. 7.

Referring to FIG. 12, as fuel rods 40 are moved through vertical consolidation section 84, the uppermost row of fuel rods 40 exits plates 96 first and contacts a roller 108 that tends to bend fuel rods 40 downwardly. As fuel rods 40 proceed through vertical consolidation section 84, each consecutive horizontal row of fuel rods 40 exits plates 96 and contacts an adjacent row of fuel rods 40 with the uppermost row of fuel rods in contact with a roller 108. With each succeeding roller 108 in a lower vertical location with respect to second housing 106 and with respect to fuel rods 40, rollers 108 cause fuel rods 40 to be vertically compacted until fuel rods 40 exit vertical consolidation section 84 in a configuration as shown in FIG. 14. In this manner, vertical consolidation section 84 provides a means to vertically consolidate fuel rods 40 as fuel rods 40 exit horizontal consolidation section 82. Fuel rods 40 thereby exit consolidation mechanism 70 in a horizontally and vertically closely packed configuration occupying approximately half the volume of the original fuel assembly configuration. When in this configuration, fuel rods 40 may be deposited in canister 72 as previously described.

It should be understood that consolidation mechanism 70 can be used with various other means for introducing the fuel rods thereinto. For example, a horizontally arranged mechanism for sliding fuel rods 40 into consolidation mechanism 70 could be equally effective.

Therefore, the invention provides a means to remotely consolidate spent nuclear fuel rods for storage.

We claim:

1. Apparatus for remotely consolidating nuclear fuel rods comprising:
   row ordering means arranged to simultaneously accept a plurality of nuclear fuel rods for rearranging said fuel rods into a different configuration without damaging said fuel rods;
   first consolidation means associated with said row ordering means for simultaneously compacting individual rows of said fuel rods without damaging said fuel rods; and
   second consolidation means associated with said row ordering means for simultaneously compacting a plurality of said fuel rods without damaging said fuel rods.

2. The apparatus according to claim 1 wherein said first consolidation means is connected to said row ordering means for compacting individual rows of said fuel rods as said fuel rods exit said row ordering means.

3. The apparatus according to claim 2 wherein said first consolidation means is located between said row ordering means and said second consolidation means and connected to said second consolidation means.

4. The apparatus according to claim 3 wherein said second consolidation means is arranged to accept individual rows of consolidated fuel rods for compacting a plurality of compacted fuel rods.

5. Apparatus for remotely consolidating nuclear fuel rods without damaging said fuel rods comprising:
   a first frame;
   a second frame;
   a plurality of hollow guide tubes having a first end supported by said first frame and having said first end arranged in a configuration for having a plurality of said fuel rods inserted therein in a configuration similar to the configuration of said fuel rods in a fuel assembly, and having a second end supported by said second frame and having said second end arranged in a closely packed configuration for rearranging said fuel rods into a closely packed configuration;

first consolidation means associated with said guide tubes for compacting individual rows of said fuel rods; and second consolidation means associated with said guide tubes for compacting said fuel rods.

6. The apparatus according to claim 5 wherein at least one of said guide tubes is bent between said first frame and said second frame.

7. Apparatus for remotely consolidating nuclear fuel rods without damaging said fuel rods comprising:
row ordering means arranged to accept a plurality of nuclear fuel rods for rearranging said fuel rods into a different configuration;
a first housing disposed near said row ordering means;
a plurality of first plates disposed in said first housing defining a plurality of first spaces therebetween for accommodating a row of said fuel rods, said first housing and said first plates being arranged in a converging manner so that each of said rows of fuel rods are compacted as said fuel rods are moved therethrough for compacting individual rows of said fuel rods as said fuel rods exit said row ordering means; and
consolidation means disposed near said first housing for accepting individual rows of compacted fuel rods and for compacting a plurality of compacted fuel rods.

8. Apparatus for remotely consolidating nuclear fuel rods without damaging said fuel rods comprising:
row ordering means arranged to accept a plurality of nuclear fuel rods for rearranging said fuel rods into a different configuration;
consolidation means disposed near said row ordering means for compacting individual rows of said fuel rods as said fuel rods exit said row ordering means;
a housing disposed near said consolidation means;
a plurality of plates disposed in said housing with each of said plates having a different length and defining a plurality of spaces therebetween for accommodating a row of said fuel rods; and
a plurality of rollers disposed in said housing near the ends of said plates for contacting a row of said fuel rods as said fuel rods emerge from beyond the end of one of said plates for bending a row of said fuel rods into contact with an adjacent row of said fuel rods thereby compacting a plurality of rows of said fuel rods.

9. The apparatus according to claim 6 wherein said first consolidation means comprises:
a first housing; and
a plurality of first plates disposed in said housing defining a plurality of first spaces therebetween for accommodating a row of said fuel rods, said housing and said first plates being arranged in a converging manner so that each of said rows of fuel rods are compacted as said fuel rods are moved therethrough.

10. The apparatus according to claim 9 wherein said second consolidation means comprises:
a second housing;
a plurality of second plates disposed in said second housing with each of said second plates having a different length and defining a plurality of second spaces therebetween for accommodating a row of said fuel rods; and
a plurality of rollers disposed in said second housing near the ends of said second plates for contacting a row of said fuel rods as said fuel rods emerge from beyond the end of one of said second plates for bending a row of said fuel rods into contact with an adjacent row of said fuel rods thereby compacting a plurality of rows of said fuel rods.

11. A method of remotely consolidating spent nuclear fuel rods without damaging the fuel rods comprising:
removing said fuel rods from a fuel assembly;
arranging said fuel rods in individual noncompacted rows;
compacting each individual row of said fuel rods into a plurality of individual compacted rows; and
compacting each of said individual compacted rows into an array of compacted rows of compacted fuel rods.

12. The method according to claim 11 wherein said step of removing said fuel rods from said fuel assembly comprises removing substantially all of said fuel rods from said fuel assembly and maintaining said fuel rods in substantially the same configuration as said fuel rods had in said fuel assembly.

13. The method according to claim 12 wherein said step of arranging said fuel rods in individual noncompacted rows comprises inserting said fuel rods into an array of hollow guide tubes with said guide tubes having its first ends arranged in a different configuration from its second ends so that moving said fuel rods through said guide tubes rearranges the configuration of said fuel rods.

14. The method according to claim 13 wherein said step of compacting each individual row of said fuel rods into a plurality of individual compacted rows comprises moving each row of fuel rods through a converging housing thereby compacting each of said rows.

15. The method according to claim 14 wherein a plurality of individual rows of fuel rods are simultaneously moved through said converging housing.

16. The method according to claim 15 wherein said step of compacting each of said individual compacted rows into an array of compacted rows of compacted fuel rods comprises bending said individual rows into contact with each other.

* * * * *